Patented Sept. 2, 1941

2,255,026

UNITED STATES PATENT OFFICE 2,255,026

FERTILIZER MANUFACTURE

Frank G. Keenen, Wilmington, Del., and Ward H. Sachs, Orlando, Fla., assignors to E. I. du Pont de Nemours & Company, Wilmington, Del., a corporation of Delaware No Drawing. Application July 6, 1939,
Serial No. 283,060

12 Claims. (Cl. 71—27)

This invention relates to fertilizers and more particularly to the production of improved nitrogen-carrying fertilizer materials.

It is well known that nitrogen is one of the elements required for satisfactory plant growth and that the presence of nitrogen is, therefore, necessary in a complete fertilizer mixture. Accordingly, various methods have previously been proposed for adding nitrogen to fertilizer materials such as, for example, the use of organic- and inorganic-nitrogen-carrying liquors. Thus, ammoniacal solutions of urea, ammonium nitrate and sodium nitrate, and the like have been added to acidic fertilizer materials, such as superphosphate, for the purpose of increasing the nitrogen content of the acidic fertilizer material. The resulting fertilizer mixtures contain water soluble nitrogen which is immediately available to plants, but, because of its water solubility characteristics, a substantial portion of this nitrogen may be removed from the soil before absorption by growing vegetation.

It is an object of the present invention to overcome the disadvantages of the prior art and to provide a new and improved process for the addition to acidic fertilizer materials of available nitrogen in a form which is not readily soluble in water.

It is a further object of this invention to provide a new and improved nitrifying liquid of a form such that when the nitrifying liquid is added to acidic fertilizer materials, a portion of its nitrogen becomes available to plants gradually and over a relatively extended period of time.

Other objects and advantages of this invention will be apparent from the following specification in which its preferred details and embodiments are described.

The improved nitrifying agent of this invention comprises a solution obtainable by mixing formaldehyde, ammonia, water and a urea, which solution upon addition to acidic fertilizer materials produces a nitrogenous fertilizer containing water soluble as well as a substantial amount of relatively water-insoluble organic nitrogen. By formaldehyde, it is meant to include any of its forms such as its solid polymers or gaseous or aqueous solutions thereof. The terms "urea" or "a urea" as used herein refer to urea and thiourea and derivatives of urea and thiourea such as the monoalkyl and monoacyl ureas and thioureas, or the urethanes and thiourethanes. These terms also include guanidine and such derivatives as the alkylated or acylated guanidine. Typical examples of compounds coming within the scope of the above definition are urea, thiourea, methyl and ethyl urea, methyl and ethyl thiourea, acetyl urea, guanidine, urethane, biuret and the like.

Thus, according to this invention, formaldehyde may be added to a solution containing urea in such proportions, preferably, that there is present in the resultant solution at least one mol of urea per mol of formaldehyde and preferably not over 5 mols of urea per mol of formaldehyde, in all cases there being preferably at least one mol of ammonia per mol of formaldehyde. More than 5 mols of urea per mol of formaldehyde in the nitrifying solution, altho operative, tends to retard formation of water-insoluble nitrogen, which otherwise forms readily, when the nitrifying solution is added to acidic fertilizer materials.

The nitrifying solution as previously pointed out can, in turn, be added to acidic fertilizer materials such as superphosphate, triple superphosphate, or a mixed fertilizer containing such phosphates to provide a complete fertilizer containing both water soluble and relatively water-insoluble nitrogen, the soluble portion being immediately available to plants and the relatively insoluble form of nitrogen being available to plants throughout their growing period.

The nitrifying solutions of this invention may be prepared in various ways, such, as, for example, by adding formaldehyde to ammoniacal solutions of the urea, or alternatively, by adding the urea to the mixture of formaldehyde and ammonia, or by adding the formaldehyde to the urea and the resultant mixture then being added to or mixed with free ammonia. Inasmuch as the addition of formaldehyde to ammoniacal solutions necessarily results in the formation of hexamethylene tetramine, it will be understood that hexamethylene tetramine may be substituted for formaldehyde in the foregoing description. Furthermore, since formaldehyde and urea may form methylol ureas prior to their admixture with ammonia, it will be understood that methylol ureas may also be substituted for formaldehyde in the above description.

Important economies can also be obtained in conjunction with the manufacture of urea, according to this invention, similarly to those set forth in U. S. 1,894,136. Thus, the urea synthesis melt obtained by pressure reaction of ammonia and carbon dioxide, or compounds containing them, need not be treated for removal of unreacted constituents and may be directly adjusted by addition of formaldehyde thereto to yield a desirable nitrogen-carrying liquid containing the desired ratios of fixed to free ammonia as well as being characterized by the ability to produce the desired quantities of water insoluble but plant-available nitrogen when added to acidic fertilizer materials.

The nitrifying liquors of this invention may be added before, during, or after addition of other materials in preparing a fertilizer. Thus, when it is desired to add nitrogen in a liquid composition to a fertilizer material, the solution of this invention may be added to or substituted for ammoniating solutions generally, such, for example, as the ammoniating or nitrifying solutions described in U. S. Patent 1,894,136, which contain both inorganic and organic nitrogen. Again, proceeding according to this invention, the nitrifying liquors of this invention may be added to acidic or phosphatic fertilizer material either before, after, or during addition of other materials, for example, potash salts, such as potassium sulfate, chloride, and nitrate; ammonium salts such as ammonium chloride, nitrate, sulfate, carbamate, ammonium- and diammonium phosphates, or the like, and then the product obtained may be further ammoniated by use of commercial aqua or anhydrous ammonia. Or, as an alternative, the acidic fertilizer materials may be first ammoniated, somewhat at least by use of ammonia as above described, and thereafter further nitrogen added to the ammoniated product by the addition to such ammoniated product of the nitrifying liquid of the present invention; or the nitrifying liquid may be added during such ammoniation with ammonia or nitrogen-containing material while, at the same time, after or before, other materials such as previously mentioned may be added to obtain a finished fertilizer.

I have, for example, found that desirable finished fertilizers may be produced by spraying or otherwise mixing the nitrifying liquid of the present invention with acidic fertilizer materials and thereafter mixing the resultant product with additional fertilizer materials such as potash salts and the like or other materials such as previously described. The proportions of nitrifying liquid to acidic fertilizer materials may vary over a wide range, dependent upon the content of water insoluble nitrogen which it is desired to have in the final product.

In utilizing the nitrifying solutions of this invention, which by themselves add various forms of nitrogen to acidic fertilizer materials, it will be apparent that many advantages are present. Containing, as such solutions do, nitrogen in a highly concentrated form, they permit the introduction in a single operation in liquid form of three sources of nitrogenous plant food into a fertilizer base, i. e., water soluble organic and inorganic nitrogen as well as nitrogen-containing products of low water solubility. Since the relative proportions of aldehyde and substituted ammonia may be varied, and since other nitrogen compounds may be added to the nitrifying solutions of this invention, such, for example, as sodium, calcium and ammonium nitrate, ammonium sulfate, and the like, a great flexibility of operation in the liquid phase is at the hand of the operator.

The following examples will illustrate the practice of this invention, although the invention is not limited to the examples.

Example 1.—By reaction of about 143 parts by weight of ammonia and about 92 parts by weight of carbon dioxide, at a temperature of 170° C. and at a pressure of about 133 atmospheres, there may be obtained a synthesis melt having the following approximate composition: ammonia 30%, urea 38%, ammonium carbamate 21%, and water 11%. To 100 parts by weight of this urea synthesis melt there is added upwards of 44.6 parts of 25.8% aqueous formaldehyde solution which results in a nitrifying liquid containing 45% total ammonia of which approximately one-fifth will appear as water insoluble nitrogen in the acidic fertilizer materials treated with this liquid, slightly less than one-eighth as water soluble organic nitrogen, and the remaining two-thirds as inorganic nitrogen.

This resulting nitrifying liquid is admirably adapted for addition to acidic fertilizer materials in the production of complete fertilizer mixtures.

Example 2.—To each 130.4 parts by weight of a 54.5% urea solution in water, there is added a mixture of 57.6 parts of 37% aqueous formaldehyde and 80.5 parts of anhydrous ammonia. The resulting solution is a nitrifying liquid similar to that described in Example 1 which may be utilized generally for use in introducing highly concentrated nitrogen, in a single operation, into a fertilizer base.

Example 3.—A nitrifying liquid similar to that described in Example 2 is prepared by mixing 57.6 parts by weight of a 37% aqueous formaldehyde solution with 130.4 parts of a 54.5% urea solution. The resulting solution is, in turn, mixed with 80.5 parts of anhydrous ammonia to give a highly desirable nitrifying liquid which, when added to acidic fertilizer materials will result in production of water insoluble but plant available nitrogen.

Example 4.—To 1840 pounds of superphosphate, there is added 160 pounds of the nitrifying liquid described in Example 1. The nitrifying liquid is preferably sprayed upon and thoroughly mixed with a superphosphate to produce an ammoniated superphosphate base having a total of 3.05% by weight of nitrogen and containing 0.7% insoluble nitrogen after one week's storage at 110° F. The ammoniated superphosphate base may be utilized for the production of a complete fertilizer by addition thereto of the other desired ingredients. Such procedure will result in the production of a complete fertilizer which possesses, in addition to the usual organic and inorganic nitrogen content, a quantity of water insoluble but plant available nitrogen, this plant available nitrogen being adapted to absorption by vegetation throughout its growing period.

Example 5.—A complete fertilizer mixture was prepared by thoroughly mixing the following ingredients:

| | Pounds |
|---|---|
| Superphosphate | 850 |
| Ammonium sulfate | 125 |
| Potassium muriate | 135 |
| Dolomitic limestone | 238 |
| Filler (sand) | 497 |
| Nitrifying solution having a content of 24.4% ammonia, 34.6% urea, 8.6% formaldehyde, and 32.4% water | 155 |

The nitrifying solution is added to the other ingredients of the complete fertilizer mixture by spraying the nitrifying solution into the mixing vessel while agitating the other ingredients. After one week at 110° F., it was found that the complete fertilizer contained 0.65% water insoluble nitrogen.

In the manufacture of fertilizers according to this invention it has been found not only that the advantages heretofore referred to are obtained, but also that, as compared with processes involving the separate addition of the same ingredients, a lower maximum temperature on ammoniation and a lower hygroscopicity of the product result. The lower temperature of ammoniation is important in that the reversion of available $P_2O_5$ as well as decomposition of urea in storage is considerably reduced. The lower hygroscopicity is of obvious importance in the storage, handling, and distribution of the fertilizers.

Various changes may be made in the compositions hereinbefore described as well as in the method for preparing and embodying the same without departing from the invention or sacrificing any of the advantages thereof.

We claim:

1. A solution prepared for use in ammoniating acid fertilizer materials comprising the product obtainable by mixing formaldehyde, a urea, water, and ammonia, the ammonia being present in the proportions of at least 1 mole of ammonia per mole of formaldehyde.

2. A solution prepared for use in ammoniating acidic fertilizer materials comprising the product obtainable by mixing formaldehyde, a urea, water, and ammonia and which solution, upon addition to acidic fertilizer materials, will form an organic nitrogen-containing product of low water solubility, the ammonia being present in the proportions of at least 1 mole of ammonia per mole of formaldehyde.

3. A solution prepared for use in ammoniating acidic fertilizer materials comprising the product obtainable by mixing water, ammonia, formaldehyde, and a urea in the ratios in the range of from 1 mol of urea per mol of formaldehyde to 5 mols of urea per mol of formaldehyde, the ammonia being present in the proportions of at least 1 mole of ammonia per mole of formaldehyde.

4. A solution prepared for use in ammoniating acidic fertilizer materials comprising the product obtainable by mixing water, ammonia, formaldehyde and urea in the ratios within the range of from 1 mol urea per mol of formaldehyde to 5 mols of urea per mol of formaldehyde, and there being present at least 1 mol of ammonia per mol of formaldehyde, and which solution, upon addition to acidic fertilizer materials will form an organic nitrogen-containing product of low water solubility.

5. A process for the production of a fertilizer which comprises incorporating with an acidic fertilizer material a nitrifying solution obtainable by mixing formaldehyde, a urea, free ammonia, and water, the ammonia being present in the proportions of at least 1 mole of ammonia per mole of formaldehyde.

6. A process for the production of a fertilizer which comprises incorporating with an acidic fertilizer material a nitrifying solution obtainable by mixing water, free ammonia, formaldehyde and urea, the ammonia being present in the proportions of at least 1 mole of ammonia per mole of formaldehyde.

7. A process for the production of a fertilizer which comprises incorporating with an acidic fertilizer material a nitrifying solution obtainable by mixing water, free ammonia, formaldehyde and a urea in the ratios in the range of from 1 mol of urea per mol of formaldehyde to 5 mols of urea per mol of formaldehyde, the ammonia being present in the proportions of at least 1 mole of ammonia per mole of formaldehyde.

8. A process for the production of a fertilizer which comprises incorporating with an acidic fertilizer material a nitrifying solution obtainable by mixing water, formaldehyde, a urea, and free ammonia and which solution, upon addition to acidic fertilizer materials, will form an organic nitrogen-containing product of low water solubility, the ammonia being present in the proportions of at least 1 mole of ammonia per mole of formaldehyde.

9. A solution prepared for use in ammoniating acidic fertilizer materials containing the product obtainable by mixing formaldehyde and urea in the range of from 1 mole urea per mole of formaldehyde to 5 moles of urea per mole of formaldehyde, together with free ammonia in the proportion of at least 1 mole of ammonia per mole of formaldehyde.

10. A process for the production of a fertilizer nitrifying solution which comprises reacting ammonia and carbon dioxide at urea-forming temperatures and pressures to give a product containing urea and free ammonia and mixing formaldehyde with the resultant product, the free ammonia being present in the proportions of at least 1 mole of ammonia per mole of formaldehyde.

11. A process for the production of a fertilizer which comprises incorporating with an acidic fertilizer material a nitrifying solution containing free ammonia and obtainable by mixing formaldehyde with the product obtained by reacting ammonia and carbon dioxide at urea-forming temperatures and pressures, the free ammonia being present in the proportions of at least 1 mole of ammonia per mole of formaldehyde.

12. A process for the production of a fertilizer which comprises incorporating with an acidic fertilizer material a nitrifying solution containing free ammonia obtainable by mixing formaldehyde with the product obtained by reacting ammonia and carbon dioxide at urea-forming temperatures and pressures, the formaldehyde being added in a quantity in the range of from 1 mole of urea per mole of formaldehyde to 5 moles of urea per mole of formaldehyde and the free ammonia being present in the proportions of at least 1 mole of ammonia per mole of formaldehyde.

FRANK G. KEENEN.
WARD H. SACHS.